(12) United States Patent
Bohn (10) Patent No.: US 9,223,138 B2
(45) Date of Patent: Dec. 29, 2015

(54) PIXEL OPACITY FOR AUGMENTED REALITY

(75) Inventor: David D. Bohn, Fort Collins, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 692 days.

(21) Appl. No.: 13/336,873

(22) Filed: Dec. 23, 2011

(65) Prior Publication Data
US 2013/0162673 A1    Jun. 27, 2013

(51) Int. Cl.
| G09G 5/00 | (2006.01) |
| G02B 27/01 | (2006.01) |
| G02B 23/10 | (2006.01) |

(52) U.S. Cl.
CPC ............ *G02B 27/0172* (2013.01); *G02B 23/10* (2013.01); *G02B 2027/0138* (2013.01); *G09G 2380/02* (2013.01)

(58) Field of Classification Search
CPC ................ G09G 5/14; G09G 2340/10; G09G 2340/125; G06T 11/60; G06T 15/503
See application file for complete search history.

(56) References Cited

U.S. PATENT DOCUMENTS

| 3,836,258 | A | * | 9/1974 | Courten et al. ............... 356/138 |
| 3,906,528 | A | * | 9/1975 | Johnson ........................ 396/141 |
| 3,971,065 | A | | 7/1976 | Bayer |
| 4,711,512 | A | | 12/1987 | Upatnieks |
| 4,822,145 | A | | 4/1989 | Staelin |
| 4,860,361 | A | | 8/1989 | Sato et al. |
| 4,957,351 | A | | 9/1990 | Shioji |
| 5,019,808 | A | | 5/1991 | Prince et al. |
| 5,146,355 | A | | 9/1992 | Prince et al. |
| 5,252,950 | A | | 10/1993 | Saunders et al. |
| 5,309,169 | A | | 5/1994 | Leppert |
| 5,359,444 | A | | 10/1994 | Piosenka et al. |
| 5,455,458 | A | | 10/1995 | Quon et al. |
| 5,459,611 | A | | 10/1995 | Bohn et al. |
| 5,483,307 | A | | 1/1996 | Anderson |
| 5,543,588 | A | | 8/1996 | Bisset et al. |

(Continued)

FOREIGN PATENT DOCUMENTS

| CN | 1440513 | 9/2003 |
| CN | 101029968 | 9/2007 |

(Continued)

OTHER PUBLICATIONS

"Non-Final Office Action", U.S. Appl. No. 13/397,516, filed Nov. 25, 2013, 10 pages.

(Continued)

*Primary Examiner* — Xiao M. Wu
*Assistant Examiner* — Michelle Chin
(74) *Attorney, Agent, or Firm* — Micah Goldsmith; Judy Yee; Micky Minhas (57) ABSTRACT

In embodiments of pixel opacity for augmented reality, a display lens system includes a first display panel that displays a virtual image generated to appear as part of an environment viewed through optical lenses. A second display panel displays an environment image of the environment as viewed through the optical lenses, and the environment image includes opaque pixels that form a black silhouette of the virtual image. The display lens system also includes a beam-splitter panel to transmit light of the environment image and reflect light of the virtual image to form a composite image that appears as the virtual image displayed over the opaque pixels of the environment image.

20 Claims, 6 Drawing Sheets

(56) References Cited

U.S. PATENT DOCUMENTS

| | | |
|---|---|---|
| 5,574,473 A | 11/1996 | Sekiguchi |
| 5,579,830 A | 12/1996 | Giammaruti |
| 5,583,609 A | 12/1996 | Mizutani et al. |
| 5,606,455 A | 2/1997 | Eichenlaub |
| 5,614,941 A | 3/1997 | Hines |
| 5,651,414 A | 7/1997 | Suzuki et al. |
| 5,673,146 A | 9/1997 | Kelly |
| 5,708,449 A | 1/1998 | Heacock et al. |
| 5,714,967 A | 2/1998 | Okamura et al. |
| 5,737,171 A | 4/1998 | Buller et al. |
| 5,751,476 A | 5/1998 | Matsui et al. |
| 5,771,320 A | 6/1998 | Stone |
| 5,856,842 A | 1/1999 | Tedesco |
| 5,861,931 A | 1/1999 | Gillian et al. |
| 5,886,822 A | 3/1999 | Spitzer |
| 5,940,149 A | 8/1999 | Vanderwerf |
| 5,959,664 A | 9/1999 | Woodgate |
| 5,982,553 A | 11/1999 | Bloom et al. |
| 5,991,087 A | 11/1999 | Rallison |
| 6,101,008 A | 8/2000 | Popovich |
| 6,144,439 A | 11/2000 | Carollo |
| 6,160,667 A | 12/2000 | Smoot |
| 6,226,178 B1 | 5/2001 | Broder et al. |
| 6,239,502 B1 | 5/2001 | Grewe et al. |
| 6,271,808 B1 | 8/2001 | Corbin |
| 6,307,142 B1 | 10/2001 | Allen et al. |
| 6,323,970 B1 | 11/2001 | Popovich |
| 6,377,401 B1 | 4/2002 | Bartlett |
| 6,411,512 B1 | 6/2002 | Mankaruse et al. |
| 6,446,442 B1 | 9/2002 | Batchelor et al. |
| 6,466,198 B1 | 10/2002 | Feinstein |
| 6,470,289 B1 | 10/2002 | Peters et al. |
| 6,481,851 B1 | 11/2002 | McNelley et al. |
| 6,496,218 B2 | 12/2002 | Takigawa et al. |
| 6,529,331 B2 | 3/2003 | Massof et al. |
| 6,542,307 B2 | 4/2003 | Gleckman et al. |
| 6,545,650 B1 | 4/2003 | Yamada et al. |
| 6,554,428 B2 | 4/2003 | Fergason et al. |
| 6,577,411 B1 | 6/2003 | David |
| 6,580,529 B1 | 6/2003 | Amitai et al. |
| 6,606,152 B2 | 8/2003 | Littau |
| 6,621,702 B2 | 9/2003 | Elias et al. |
| 6,631,755 B1 | 10/2003 | Kung et al. |
| 6,635,999 B2 | 10/2003 | Belliveau |
| 6,639,201 B2 | 10/2003 | Almogy et al. |
| 6,735,499 B2 | 5/2004 | Ohki et al. |
| 6,753,828 B2 | 6/2004 | Tuceryan et al. |
| 6,775,460 B2 | 8/2004 | Steiner et al. |
| 6,804,115 B2 | 10/2004 | Lai |
| 6,809,925 B2 | 10/2004 | Belady et al. |
| 6,825,987 B2 | 11/2004 | Repetto et al. |
| 6,829,095 B2 | 12/2004 | Amitai |
| 6,867,753 B2 | 3/2005 | Chinthammit et al. |
| 6,888,613 B2 | 5/2005 | Robins et al. |
| 6,889,755 B2 | 5/2005 | Zuo et al. |
| 6,906,901 B1 | 6/2005 | Liu |
| 6,919,867 B2 | 7/2005 | Sauer |
| 6,947,020 B2 | 9/2005 | Kiser et al. |
| 6,964,731 B1 | 11/2005 | Krisko et al. |
| 6,971,443 B2 | 12/2005 | Kung et al. |
| 6,992,738 B2 | 1/2006 | Ishihara et al. |
| 6,997,241 B2 | 2/2006 | Chou et al. |
| 7,006,215 B2 | 2/2006 | Hoff et al. |
| 7,015,876 B1 | 3/2006 | Miller |
| 7,048,385 B2 | 5/2006 | Beeson et al. |
| 7,069,975 B1 | 7/2006 | Haws et al. |
| 7,113,605 B2 | 9/2006 | Rui et al. |
| 7,116,555 B2 | 10/2006 | Kamath et al. |
| 7,184,615 B2 | 2/2007 | Levola |
| 7,191,820 B2 | 3/2007 | Chou et al. |
| 7,193,584 B2 | 3/2007 | Lee et al. |
| 7,250,930 B2 | 7/2007 | Hoffman et al. |
| 7,261,453 B2 | 8/2007 | Morejon et al. |
| 7,271,795 B2 | 9/2007 | Bradski |
| 7,277,282 B2 | 10/2007 | Tate |
| 7,301,587 B2 | 11/2007 | Uehara et al. |
| 7,337,018 B2 | 2/2008 | Espinoza-Ibarra et al. |
| 7,359,420 B2 | 4/2008 | Shchegrov et al. |
| 7,365,734 B2 | 4/2008 | Fateh et al. |
| 7,369,101 B2 | 5/2008 | Sauer et al. |
| 7,376,852 B2 | 5/2008 | Edwards |
| 7,396,133 B2 | 7/2008 | Burnett et al. |
| 7,412,306 B2 | 8/2008 | Katoh et al. |
| 7,416,017 B2 | 8/2008 | Haws et al. |
| 7,417,617 B2 | 8/2008 | Eichenlaub |
| 7,428,001 B2 | 9/2008 | Schowengerdt et al. |
| 7,430,349 B2 | 9/2008 | Jones |
| 7,430,355 B2 | 9/2008 | Heikenfeld et al. |
| 7,455,102 B2 | 11/2008 | Cheng |
| 7,505,269 B1 | 3/2009 | Cosley et al. |
| 7,513,627 B2 | 4/2009 | Larson et al. |
| 7,515,143 B2 | 4/2009 | Keam et al. |
| 7,542,665 B2 | 6/2009 | Lei |
| 7,551,814 B1 | 6/2009 | Smits |
| 7,576,916 B2 | 8/2009 | Amitai |
| 7,583,327 B2 | 9/2009 | Takatani |
| 7,607,111 B2 | 10/2009 | Vaananen et al. |
| 7,619,895 B1 | 11/2009 | Wertz et al. |
| 7,631,687 B2 | 12/2009 | Yang |
| 7,646,606 B2 | 1/2010 | Rytka et al. |
| 7,649,594 B2 | 1/2010 | Kim et al. |
| 7,660,500 B2 | 2/2010 | Konttinen et al. |
| 7,679,641 B2 | 3/2010 | Lipton et al. |
| 7,693,292 B1 | 4/2010 | Gross et al. |
| 7,701,716 B2 | 4/2010 | Blanco, Jr. et al. |
| 7,719,769 B2 | 5/2010 | Sugihara et al. |
| 7,768,534 B2 | 8/2010 | Pentenrieder et al. |
| 7,777,944 B2 | 8/2010 | Ho et al. |
| 7,817,104 B2 | 10/2010 | Ryu et al. |
| 7,832,885 B2 | 11/2010 | Hsiao et al. |
| 7,843,691 B2 | 11/2010 | Reichert et al. |
| 7,894,613 B1 | 2/2011 | Ong et al. |
| 7,903,409 B2 | 3/2011 | Patel et al. |
| 7,909,958 B2 | 3/2011 | Washburn et al. |
| 7,941,231 B1 | 5/2011 | Dunn |
| 7,986,462 B2 | 7/2011 | Kobayashi et al. |
| 8,004,621 B2 | 8/2011 | Woodgate et al. |
| 8,033,709 B2 | 10/2011 | Kao et al. |
| 8,046,616 B2 | 10/2011 | Edwards |
| 8,061,411 B2 | 11/2011 | Xu et al. |
| 8,085,948 B2 | 12/2011 | Thomas et al. |
| 8,092,064 B2 | 1/2012 | Erchak et al. |
| 8,125,579 B2 | 2/2012 | Khan et al. |
| 8,160,411 B2 | 4/2012 | Levola et al. |
| 8,195,220 B2 | 6/2012 | Kim et al. |
| 8,233,204 B1 | 7/2012 | Robbins et al. |
| 8,233,273 B2 | 7/2012 | Chen et al. |
| 8,246,170 B2 | 8/2012 | Yamamoto et al. |
| 8,274,614 B2 | 9/2012 | Yokote et al. |
| 8,384,999 B1 | 2/2013 | Crosby et al. |
| 8,392,035 B2 | 3/2013 | Patel et al. |
| 8,395,898 B1 | 3/2013 | Chamseddine et al. |
| 8,418,083 B1 | 4/2013 | Lundy et al. |
| 8,446,340 B2 | 5/2013 | Aharoni |
| 8,472,119 B1 | 6/2013 | Kelly |
| 8,482,920 B2 | 7/2013 | Tissot et al. |
| 8,576,143 B1 | 11/2013 | Kelly |
| 8,611,014 B2 | 12/2013 | Valera et al. |
| 8,629,815 B2 | 1/2014 | Brin et al. |
| 8,638,498 B2 | 1/2014 | Bohn |
| 8,645,871 B2 | 2/2014 | Fong et al. |
| 8,666,212 B1 | 3/2014 | Amirparviz |
| 8,712,598 B2 | 4/2014 | Dighde et al. |
| 8,754,831 B2 | 6/2014 | Kollin et al. |
| 8,810,600 B2 | 8/2014 | Bohn et al. |
| 8,817,350 B1 | 8/2014 | Robbins et al. |
| 8,823,531 B1 | 9/2014 | McCleary et al. |
| 8,909,384 B1 | 12/2014 | Beitelmal et al. |
| 8,917,453 B2 | 12/2014 | Bohn |
| 8,934,235 B2 | 1/2015 | Rubenstein et al. |
| 8,941,683 B2 | 1/2015 | Son et al. |
| 8,989,535 B2 | 3/2015 | Robbins |
| 2001/0043208 A1 | 11/2001 | Furness, III et al. |
| 2002/0041735 A1 | 4/2002 | Cai et al. |

(56) References Cited

U.S. PATENT DOCUMENTS

| | | |
|---|---|---|
| 2002/0044152 A1 | 4/2002 | Abbott et al. |
| 2002/0044162 A1 | 4/2002 | Sawatari |
| 2002/0063820 A1 | 5/2002 | Broer et al. |
| 2002/0097558 A1 | 7/2002 | Stone et al. |
| 2002/0171939 A1 | 11/2002 | Song |
| 2002/0180659 A1 | 12/2002 | Takahashi |
| 2003/0006364 A1 | 1/2003 | Katzir et al. |
| 2003/0023889 A1 | 1/2003 | Hofstee et al. |
| 2003/0137706 A1 | 7/2003 | Rmanujam et al. |
| 2004/0011503 A1 | 1/2004 | Kung et al. |
| 2004/0085649 A1 | 5/2004 | Repetto et al. |
| 2004/0108971 A1 | 6/2004 | Waldern et al. |
| 2004/0109234 A1 | 6/2004 | Levola |
| 2004/0135209 A1 | 7/2004 | Hsieh et al. |
| 2004/0195963 A1 | 10/2004 | Choi et al. |
| 2004/0267990 A1 | 12/2004 | Lin |
| 2005/0174737 A1 | 8/2005 | Meir |
| 2005/0207120 A1 | 9/2005 | Tseng et al. |
| 2005/0225233 A1 | 10/2005 | Boroson et al. |
| 2005/0243107 A1 | 11/2005 | Haim et al. |
| 2005/0248705 A1 | 11/2005 | Smith et al. |
| 2005/0285878 A1 | 12/2005 | Singh et al. |
| 2006/0018025 A1 | 1/2006 | Sharon et al. |
| 2006/0032616 A1 | 2/2006 | Yang |
| 2006/0038881 A1 | 2/2006 | Starkweather et al. |
| 2006/0044399 A1 | 3/2006 | Fredlund et al. |
| 2006/0054787 A1 | 3/2006 | Olsen et al. |
| 2006/0072206 A1 | 4/2006 | Tsuyuki et al. |
| 2006/0118280 A1 | 6/2006 | Liu |
| 2006/0129951 A1 | 6/2006 | Vaananen et al. |
| 2006/0132914 A1 | 6/2006 | Weiss et al. |
| 2006/0139447 A1 | 6/2006 | Unkrich |
| 2006/0152646 A1 | 7/2006 | Schrader |
| 2006/0164382 A1 | 7/2006 | Kulas et al. |
| 2006/0196643 A1 | 9/2006 | Hata et al. |
| 2006/0221448 A1 | 10/2006 | Nivon et al. |
| 2006/0228073 A1 | 10/2006 | Mukawa et al. |
| 2006/0249765 A1 | 11/2006 | Hsieh |
| 2007/0002412 A1 | 1/2007 | Aihara |
| 2007/0008456 A1 | 1/2007 | Lesage et al. |
| 2007/0027591 A1 | 2/2007 | Goldenberg et al. |
| 2007/0041684 A1 | 2/2007 | Popovich |
| 2007/0097019 A1 | 5/2007 | Wynne-Powell et al. |
| 2007/0147673 A1 | 6/2007 | Crandall |
| 2007/0153395 A1 | 7/2007 | Repetto et al. |
| 2007/0177260 A1* | 8/2007 | Kuppenheimer et al. ..... 359/399 |
| 2007/0236959 A1 | 10/2007 | Tolbert |
| 2007/0284093 A1 | 12/2007 | Bhatti et al. |
| 2008/0043100 A1 | 2/2008 | Sobel et al. |
| 2008/0043425 A1 | 2/2008 | Hebert et al. |
| 2008/0088603 A1 | 4/2008 | Eliasson et al. |
| 2008/0088624 A1 | 4/2008 | Long et al. |
| 2008/0106677 A1 | 5/2008 | Kuan et al. |
| 2008/0117341 A1 | 5/2008 | McGrew |
| 2008/0141681 A1 | 6/2008 | Arnold |
| 2008/0150913 A1 | 6/2008 | Bell et al. |
| 2008/0174735 A1 | 7/2008 | Quach et al. |
| 2008/0232680 A1 | 9/2008 | Berestov et al. |
| 2008/0248852 A1 | 10/2008 | Rasmussen |
| 2008/0285140 A1 | 11/2008 | Amitai |
| 2008/0297535 A1 | 12/2008 | Reinig |
| 2008/0303918 A1 | 12/2008 | Keithley |
| 2008/0311386 A1 | 12/2008 | Wendt |
| 2009/0002939 A1 | 1/2009 | Baugh et al. |
| 2009/0015742 A1 | 1/2009 | Liao et al. |
| 2009/0021908 A1 | 1/2009 | Patel et al. |
| 2009/0051283 A1 | 2/2009 | Cok et al. |
| 2009/0084525 A1 | 4/2009 | Satou et al. |
| 2009/0092261 A1 | 4/2009 | Bard |
| 2009/0097127 A1 | 4/2009 | Amitai |
| 2009/0128449 A1 | 5/2009 | Brown et al. |
| 2009/0128901 A1 | 5/2009 | Tilleman et al. |
| 2009/0180250 A1 | 7/2009 | Holling et al. |
| 2009/0189974 A1 | 7/2009 | Deering |
| 2009/0190003 A1 | 7/2009 | Park et al. |
| 2009/0195756 A1 | 8/2009 | Li et al. |
| 2009/0222147 A1 | 9/2009 | Nakashima et al. |
| 2009/0244413 A1 | 10/2009 | Ishikawa et al. |
| 2009/0256837 A1 | 10/2009 | Deb et al. |
| 2009/0262419 A1 | 10/2009 | Robinson et al. |
| 2010/0002989 A1 | 1/2010 | Tokushima |
| 2010/0021108 A1 | 1/2010 | Kang et al. |
| 2010/0053151 A1 | 3/2010 | Marti et al. |
| 2010/0060551 A1 | 3/2010 | Sugiyama et al. |
| 2010/0061078 A1 | 3/2010 | Kim |
| 2010/0084674 A1 | 4/2010 | Paetzold et al. |
| 2010/0096617 A1 | 4/2010 | Shanks |
| 2010/0103078 A1* | 4/2010 | Mukawa et al. ................. 345/8 |
| 2010/0134534 A1 | 6/2010 | Sesselberg et al. |
| 2010/0141905 A1 | 6/2010 | Burke |
| 2010/0149073 A1 | 6/2010 | Chaum et al. |
| 2010/0188353 A1 | 7/2010 | Yoon et al. |
| 2010/0200736 A1 | 8/2010 | Laycock et al. |
| 2010/0201953 A1 | 8/2010 | Freeman et al. |
| 2010/0213467 A1 | 8/2010 | Lee et al. |
| 2010/0220439 A1 | 9/2010 | Qin |
| 2010/0229853 A1 | 9/2010 | Vandal et al. |
| 2010/0238270 A1 | 9/2010 | Bjelkhagen et al. |
| 2010/0245387 A1 | 9/2010 | Bachelder et al. |
| 2010/0259889 A1 | 10/2010 | Chen et al. |
| 2010/0271467 A1 | 10/2010 | Akeley |
| 2010/0277421 A1 | 11/2010 | Charlier et al. |
| 2010/0277439 A1 | 11/2010 | Charlier et al. |
| 2010/0277779 A1 | 11/2010 | Futterer et al. |
| 2010/0281439 A1 | 11/2010 | Markovic et al. |
| 2010/0300654 A1 | 12/2010 | Edwards |
| 2010/0309687 A1 | 12/2010 | Sampsell et al. |
| 2010/0315781 A1 | 12/2010 | Agostini |
| 2010/0317132 A1 | 12/2010 | Rogers et al. |
| 2010/0321609 A1 | 12/2010 | Qi et al. |
| 2010/0328351 A1 | 12/2010 | Tan |
| 2011/0012814 A1 | 1/2011 | Tanaka |
| 2011/0021251 A1 | 1/2011 | Lindén |
| 2011/0025605 A1 | 2/2011 | Kwitek |
| 2011/0032482 A1 | 2/2011 | Agurok |
| 2011/0050547 A1 | 3/2011 | Mukawa |
| 2011/0050655 A1 | 3/2011 | Mukawa |
| 2011/0063795 A1 | 3/2011 | Yeh et al. |
| 2011/0075442 A1 | 3/2011 | Chiang |
| 2011/0084893 A1 | 4/2011 | Lee et al. |
| 2011/0090343 A1 | 4/2011 | Alt et al. |
| 2011/0091156 A1 | 4/2011 | Laughlin |
| 2011/0051660 A1 | 5/2011 | Popovich et al. |
| 2011/0110728 A1 | 5/2011 | Jarvenpaa et al. |
| 2011/0114823 A1 | 5/2011 | Katzir et al. |
| 2011/0127024 A1 | 6/2011 | Patel et al. |
| 2011/0134017 A1 | 6/2011 | Burke |
| 2011/0134645 A1 | 6/2011 | Hitchcock et al. |
| 2011/0141388 A1 | 6/2011 | Park et al. |
| 2011/0148931 A1 | 6/2011 | Kim |
| 2011/0163986 A1 | 7/2011 | Lee et al. |
| 2011/0194029 A1 | 8/2011 | Herrmann et al. |
| 2011/0205251 A1 | 8/2011 | Auld |
| 2011/0210946 A1 | 9/2011 | Goertz et al. |
| 2011/0214082 A1 | 9/2011 | Osterhout et al. |
| 2011/0215349 A1 | 9/2011 | An et al. |
| 2011/0221658 A1 | 9/2011 | Haddick et al. |
| 2011/0221659 A1* | 9/2011 | King et al. ........................ 345/8 |
| 2011/0222236 A1 | 9/2011 | Luo et al. |
| 2011/0227820 A1 | 9/2011 | Haddick et al. |
| 2011/0227913 A1 | 9/2011 | Hyndman |
| 2011/0242145 A1 | 10/2011 | Nishimura et al. |
| 2011/0242392 A1 | 10/2011 | Chiang |
| 2011/0242757 A1 | 10/2011 | Tracy et al. |
| 2011/0248904 A1 | 10/2011 | Miyawaki et al. |
| 2011/0248958 A1 | 10/2011 | Gruhlke et al. |
| 2011/0267799 A1 | 11/2011 | Epstein et al. |
| 2011/0283223 A1 | 11/2011 | Vaittinen et al. |
| 2011/0299044 A1 | 12/2011 | Yeh et al. |
| 2011/0304640 A1 | 12/2011 | Noge |
| 2011/0309378 A1 | 12/2011 | Lau et al. |
| 2011/0310232 A1 | 12/2011 | Wilson et al. |
| 2011/0310312 A1 | 12/2011 | Yokote et al. |
| 2012/0013651 A1 | 1/2012 | Trayner et al. |

(56) References Cited

U.S. PATENT DOCUMENTS

| | | |
|---|---|---|
| 2012/0019434 A1 | 1/2012 | Kuhlman et al. |
| 2012/0026161 A1 | 2/2012 | Chen et al. |
| 2012/0033306 A1 | 2/2012 | Valera et al. |
| 2012/0038629 A1 | 2/2012 | Brown et al. |
| 2012/0041721 A1 | 2/2012 | Chen |
| 2012/0050144 A1 | 3/2012 | Morlock et al. |
| 2012/0052934 A1 | 3/2012 | Maharbiz et al. |
| 2012/0062998 A1 | 3/2012 | Schultz et al. |
| 2012/0069413 A1 | 3/2012 | Schultz |
| 2012/0102438 A1 | 4/2012 | Robinson et al. |
| 2012/0106170 A1* | 5/2012 | Matthews et al. ........ 362/311.06 |
| 2012/0111544 A1 | 5/2012 | Senatori |
| 2012/0113092 A1* | 5/2012 | Bar-Zeev et al. ............. 345/419 |
| 2012/0157114 A1 | 6/2012 | Alameh et al. |
| 2012/0162764 A1 | 6/2012 | Shimizu |
| 2012/0176474 A1 | 7/2012 | Border |
| 2012/0182687 A1 | 7/2012 | Dighde et al. |
| 2012/0188205 A1 | 7/2012 | Jansson et al. |
| 2012/0200495 A1 | 8/2012 | Johansson |
| 2012/0206589 A1 | 8/2012 | Crandall |
| 2012/0206880 A1 | 8/2012 | Andres et al. |
| 2012/0218301 A1 | 8/2012 | Miller |
| 2012/0227006 A1 | 9/2012 | Amm |
| 2012/0235885 A1 | 9/2012 | Miller et al. |
| 2012/0242561 A1 | 9/2012 | Sugihara |
| 2012/0256856 A1 | 10/2012 | Suzuki et al. |
| 2012/0256963 A1 | 10/2012 | Suzuki et al. |
| 2012/0287381 A1 | 11/2012 | Li et al. |
| 2013/0000871 A1 | 1/2013 | Olson et al. |
| 2013/0033485 A1 | 2/2013 | Kollin et al. |
| 2013/0081779 A1 | 4/2013 | Liao et al. |
| 2013/0093741 A1 | 4/2013 | Akimoto et al. |
| 2013/0106674 A1 | 5/2013 | Wheeler et al. |
| 2013/0163089 A1 | 6/2013 | Bohn |
| 2013/0170031 A1 | 7/2013 | Bohn |
| 2013/0186596 A1 | 7/2013 | Rubenstein |
| 2013/0186598 A1 | 7/2013 | Rubenstein |
| 2013/0187943 A1 | 7/2013 | Bohn et al. |
| 2013/0207964 A1 | 8/2013 | Fleck |
| 2013/0208003 A1 | 8/2013 | Bohn |
| 2013/0208362 A1 | 8/2013 | Bohn |
| 2013/0208482 A1 | 8/2013 | Fleck |
| 2013/0215081 A1 | 8/2013 | Levin et al. |
| 2013/0242056 A1 | 9/2013 | Fleck |
| 2013/0252628 A1 | 9/2013 | Kuehnel |
| 2013/0257848 A1 | 10/2013 | Westerinen et al. |
| 2013/0258701 A1 | 10/2013 | Westerinen et al. |
| 2013/0267309 A1 | 10/2013 | Robbins |
| 2013/0294030 A1 | 11/2013 | Wang et al. |
| 2013/0307875 A1 | 11/2013 | Anderson |
| 2013/0314793 A1 | 11/2013 | Robbins |
| 2013/0322810 A1 | 12/2013 | Robbins |
| 2013/0332159 A1 | 12/2013 | Federighi et al. |
| 2013/0335671 A1 | 12/2013 | Fleck |
| 2013/0342674 A1 | 12/2013 | Dixon |
| 2014/0010265 A1 | 1/2014 | Peng |
| 2014/0041827 A1 | 2/2014 | Giaimo |
| 2014/0078130 A1 | 3/2014 | Uchino et al. |
| 2014/0094973 A1 | 4/2014 | Giaimo et al. |
| 2014/0104665 A1 | 4/2014 | Popovich et al. |
| 2014/0104685 A1 | 4/2014 | Bohn |
| 2014/0111865 A1 | 4/2014 | Kobayashi |
| 2014/0140653 A1 | 5/2014 | Brown et al. |
| 2014/0140654 A1 | 5/2014 | Brown et al. |
| 2014/0176528 A1 | 6/2014 | Robbins |
| 2014/0184699 A1 | 7/2014 | Ito et al. |
| 2014/0204455 A1 | 7/2014 | Popovich |
| 2014/0240842 A1 | 8/2014 | Nguyen et al. |
| 2015/0168731 A1 | 6/2015 | Robbins |
| 2015/0227231 A1 | 8/2015 | Chen |

FOREIGN PATENT DOCUMENTS

| | | |
|---|---|---|
| CN | 102004315 | 4/2011 |
| EP | 0977022 | 2/2000 |
| EP | 1494109 | 1/2005 |
| EP | 2112547 | 10/2009 |
| EP | 2216678 | 1/2010 |
| JP | H0422358 | 1/1992 |
| JP | 7311303 | 11/1995 |
| JP | 2001078234 | 3/2001 |
| JP | 2008017135 | 1/2008 |
| KR | 20090076539 | 7/2009 |
| KR | 20110070087 | 6/2011 |
| KR | 20120023458 | 3/2012 |
| WO | WO-9418595 | 8/1994 |
| WO | WO-0133282 | 5/2001 |
| WO | WO-0195027 | 12/2001 |
| WO | WO-03090611 | 11/2003 |
| WO | WO-2006054056 | 5/2006 |
| WO | WO-2008021504 | 2/2008 |
| WO | WO-2009077601 | 6/2009 |
| WO | WO-2010125337 | 11/2010 |
| WO | WO-2011003381 | 1/2011 |
| WO | WO-2011051660 | 5/2011 |
| WO | WO-2011090455 | 7/2011 |
| WO | WO-2011110728 | 9/2011 |
| WO | WO-2011131978 | 10/2011 |
| WO | WO-2012172295 | 12/2012 |
| WO | WO-2014130383 | 8/2014 |

OTHER PUBLICATIONS

"Final Office Action", U.S. Appl. No. 13/336,895, filed May 27, 2014, 11 pages.

"Final Office Action", U.S. Appl. No. 13/397,495, filed May 29, 2014, 10 pages.

"Non-Final Office Action", U.S. Appl. No. 13/397,516, filed Jun. 12, 2014, 11 pages.

"Non-Final Office Action", U.S. Appl. No. 14/134,993, filed Apr. 17, 2014, 34 pages.

"Notice of Allowance", U.S. Appl. No. 13/356,545, filed Mar. 28, 2014, 6 pages.

"Non-Final Office Action", U.S. Appl. No. 13/343,675, filed Jul. 16, 2013, 9 pages.

"PCT Search Report and Written Opinion", Application No. PCT/US2013/026200, (Jun. 3, 2013), 9 pages.

"Non-Final Office Action", U.S. Appl. No. 13/397,495, filed Nov. 13, 2013, 8 pages.

"Non-Final Office Action", U.S. Appl. No. 13/336,895, filed Oct. 24, 2013, 9 pages.

"Notice of Allowance", U.S. Appl. No. 13/343,675, filed Sep. 16, 2013, 8 pages.

"International Search Report and Written Opinion", Application No. PCT/US2012/069330, (Mar. 28, 2013),9 pages.

"PCT Search Report and Written Opinion", Application No. PCT/US2012/069331, (Mar. 29, 2013),10 pages.

"PCT Search Report and Written Opinion", Application No. PCT/US2012/071563, (Apr. 25, 2013),13 pages.

"PCT Search Report and Written Opinion", Application No. PCT/US2013/026200, (Jun. 3, 2013),9 pages.

Allen, Steven C., "ELiXIR—Solid-State Luminaire with Enhanced Light Extraction by Internal Reflection", *Journal of Display Technology*, vol. 3, No. 2, Available at <http://www.nanolab.uc.edu/Publications/PDFfiles/355.pdf>,(Jun. 2007),pp. 155-159.

Baluja, Shumeet et al., "Non-Intrusive Gaze Tracking Using Artificial Neural Networks", *Technical Report CMU-CS-94-102*, Available at <http://citeseerx.ist.psu.edu/viewdoc/download?doi=10.1.1.33.4027&rep=rep1&type=pdf>,(Jan. 5, 1994),14 pages.

Karp, Jason H., et al., "Planar Micro-optic Solar Concentration using Multiple Imaging Lenses into a Common Slab Waveguide", *In Proceedings of SPIE* vol.7407, Available at <http://psilab.ucsd.edu/research/slab_concentration/files/SPIE_Slab_Published.pdf>,(Jan. 2009),11 pages.

Singh Brar, Rajwinder et al., "Laser-Based Head-Tracked 3D Display Research", *Journal of Display Technology*, vol. 6, No. 10, Avail-

(56) References Cited

OTHER PUBLICATIONS able at <http://ieeexplore.ieee.org/stamp/stamp.jsp?tp=&arnumber=5462999>,(Oct. 2010), pp. 531-543.

Cheng, Yu-Hsiang et al., "Waveguide Displays Based on Polymer-dispersed Liquid Crystals", *SPIE Newsroom*, Available at <http://spie.org/documents/Newsroom/Imported/003805/003805_10.pdf>,(Aug. 12, 2011),2 pages.

"HDTV Helmet Mounted Display", Available at <http://defense-update.com/products/h/HDTV-HMD.htm>,(Jan. 26, 2005),1 page.

"Final Office Action", U.S. Appl. No. 14/134,993, filed Aug. 20, 2014, 15 pages.

"Foreign Office Action", CN Application No. 201210567932.5, Aug. 14, 2014, 12 pages.

"Non-Final Office Action", U.S. Appl. No. 13/397,617, filed Oct. 9, 2014, 6 pages.

"Notice of Allowance", U.S. Appl. No. 13/336,895, filed Aug. 11, 2014, 6 pages.

"Supplemental Notice of Allowance", U.S. Appl. No. 13/356,545, filed Jul. 22, 2014, 2 pages.

"Final Office Action", U.S. Appl. No. 13/397,516, filed Jan. 29, 2015, 13 pages.

"Foreign Office Action", CN Application No. 201210563730.3, Jan. 7, 2015, 16 pages.

"Non-Final Office Action", U.S. Appl. No. 13/397,539, filed Mar. 16, 2015, 9 pages.

"Non-Final Office Action", U.S. Appl. No. 14/134,993, filed Jan. 22, 2015, 17 pages.

"Restriction Requirement", U.S. Appl. No. 13/397,539, filed Dec. 1, 2014, 6 pages.

"Advisory Action", U.S. Appl. No. 13/428,879, filed Sep. 19, 2014, 3 pages.

"Augmented Reality and Physical Games", U.S. Appl. No. 13/440,165, filed Apr. 5, 2012, 49 pages.

"BragGrate Mirror", Retrieved from <http://web.archive.org/web/20090814104232/http://www.optigrate.com/BragGrate_Mirror.html> on Jul. 8, 2014, Aug. 14, 2009, 2 pages.

"Corrected Final Office Action", U.S. Appl. No. 13/432,311, filed Dec. 24, 2014, 25 pages.

"Corrected Notice of Allowance", U.S. Appl. No. 13/355,836, filed Sep. 11, 2014, 2 pages.

"Corrected Notice of Allowance", U.S. Appl. No. 13/355,836, filed Dec. 15, 2014, 2 pages.

"DigiLens", SBG Labs, retrieved from <http://www.digilens.com/products.html> on Jun. 19, 2012, 1 page.

"Final Office Action", U.S. Appl. No. 13/355,836, filed Mar. 10, 2014, 18 pages.

"Final Office Action", U.S. Appl. No. 13/355,914, filed Feb. 23, 2015, 21 pages.

"Final Office Action", U.S. Appl. No. 13/355,914, filed Jun. 19, 2014, 11 pages.

"Final Office Action", U.S. Appl. No. 13/428,879, filed Jul. 14, 2014, 12 pages.

"Final Office Action", U.S. Appl. No. 13/432,311, filed Dec. 15, 2014, 24 pages.

"Final Office Action", U.S. Appl. No. 13/432,372, filed Jan. 29, 2015, 33 pages.

"Final Office Action", U.S. Appl. No. 13/440,165, filed Jun. 6, 2014, 12 pages.

"Final Office Action", U.S. Appl. No. 13/477,646, filed Feb. 23, 2015, 36 pages.

"Final Office Action", U.S. Appl. No. 13/477,646, filed May 5, 2014, 26 pages.

"Final Office Action", U.S. Appl. No. 13/525,649, filed Oct. 9, 2014, 8 pages.

"Foreign Notice of Allowance", CN Application No. 201320034345.X, Aug. 14, 2013, 2 Pages.

"International Search Report and Written Opinion", Application No. PCT/US2014/016658, 10 pages.

"International Search Report and Written Opinion", Application No. PCT/US2013/053676, Oct. 16, 2013, 10 pages.

"International Search Report and Written Opinion", Application No. PCT/US2013/030632, Jun. 26, 2013, 10 pages.

"International Search Report and Written Opinion", Application No. PCT/US2013/028477, Jun. 21, 2013, 11 pages.

"International Search Report and Written Opinion", Application No. PCT/US2013/031111, Jun. 26, 2013, 11 pages.

"International Search Report and Written Opinion", Application No. PCT/US2013/076832, Mar. 17, 2014, 12 pages.

"International Search Report and Written Opinion", Application No. PCT/US2013/061225, Jun. 4, 2014, 12 pages.

"International Search Report and Written Opinion", Application No. PCT/US2013/021784, Apr. 30, 2013, 9 pages.

"International Search Report and Written Opinion", Application No. PCT/US2013/021783, May 15, 2013, 9 pages.

"Light Guide Techniques using LED Lamps", Application Brief I-003, retrieved from <http://www.ciri.org.nz/downloads/Lightpipe%20design.pdf> on Jan. 12, 2012,Oct. 14, 2008, 22 pages.

"Non-Final Office Action", U.S. Appl. No. 13/440,165, filed Feb. 6, 2014, 12 pages.

"Non-Final Office Action", U.S. Appl. No. 13/355,836, filed Nov. 4, 2013, 15 pages.

"Non-Final Office Action", U.S. Appl. No. 13/355,914, filed Feb. 14, 2014, 10 pages.

"Non-Final Office Action", U.S. Appl. No. 13/355,914, filed Oct. 28, 2014, 18 pages.

"Non-Final Office Action", U.S. Appl. No. 13/428,879, filed Feb. 24, 2015, 10 pages.

"Non-Final Office Action", U.S. Appl. No. 13/428,879, filed Mar. 17, 2014, 10 pages.

"Non-Final Office Action", U.S. Appl. No. 13/432,311, filed Jul. 8, 2014, 33 pages.

"Non-Final Office Action", U.S. Appl. No. 13/432,372, filed May 9, 2014, 26 pages.

"Non-Final Office Action", U.S. Appl. No. 13/432,372, filed Oct. 24, 2014, 27 pages.

"Non-Final Office Action", U.S. Appl. No. 13/440,165, filed Feb. 13, 2015, 10 pages.

"Non-Final Office Action", U.S. Appl. No. 13/440,165, filed Oct. 16, 2014, 11 pages.

"Non-Final Office Action", U.S. Appl. No. 13/477,646, filed Oct. 6, 2014, 34 pages.

"Non-Final Office Action", U.S. Appl. No. 13/477,646, filed Nov. 22, 2013, 20 pages.

"Non-Final Office Action", U.S. Appl. No. 13/525,649, filed Jan. 29, 2014, 7 pages.

"Non-Final Office Action", U.S. Appl. No. 13/525,649, filed Feb. 5, 2015, 7 pages.

"Non-Final Office Action", U.S. Appl. No. 13/525,649, filed Jun. 5, 2014, 7 pages.

"Non-Final Office Action", U.S. Appl. No. 13/570,073, filed Jan. 23, 2015, 7 pages.

"Non-Final Office Action", U.S. Appl. No. 13/631,308, filed Feb. 23, 2015, 9 pages.

"Non-Final Office Action", U.S. Appl. No. 13/774,875, filed Nov. 24, 2014, 8 pages.

"Notice of Allowance", U.S. Appl. No. 13/355,836, filed Jun. 13, 2014, 11 pages.

"Notice of Allowance", U.S. Appl. No. 13/355,836, filed Oct. 8, 2014, 11 pages.

"Notice of Allowance", U.S. Appl. No. 13/488,145, filed Nov. 19, 2014, 8 pages.

"Restriction Requirement", U.S. Appl. No. 13/355,836, filed Sep. 27, 2013, 6 pages.

"Restriction Requirement", U.S. Appl. No. 13/488,145, filed Sep. 8, 2014, 14 pages.

"Restriction Requirement", U.S. Appl. No. 13/570,073, filed Nov. 18, 2014, 7 pages.

"Two-Faced: Transparent Phone with Dual Touch Screens", Retrieved from <http://gajitz.com/two-faced-transparent-phone-with-dual-touch-screens/>, Jun. 7, 2012, 3 pages.

"Written Opinion", Application No. PCT/US2013/061225, Oct. 10, 2014, 6 Pages.

(56) References Cited

OTHER PUBLICATIONS

Aron, "'Sprinting' chips could push phones to the speed limit", New Scientist, Feb. 20, 2012, Issue #2852, Feb. 20, 2012, 2 pages.
Barger, "COTS Cooling", Publication of the National Electronics Manufacturing Center of Excellence, Retrieved from: <http://www.empf.org/empfasis/2009/Oct09/cots.html > on Jul. 9, 2012,Oct. 2009, 4 pages.
Baudisch, et al., "Back-of-Device Interaction Allows Creating Very Small Touch Devices", In Proceedings of 27th International Conference on Human Factors in Computing Systems, Retrieved from <http://citeseerx.ist.psu.edu/viewdoc/download?doi=10.1.1.160.3337&rep=rep1&type=pdf>,Apr. 2005, 10 pages.
Baxtor, "TwinTech GeForce GTS 250 XT OC 1GB Graphics Card", retrieved from <http://www.tweaktown.com/reviews/2733/twintech_geforce_gts_250_xt_oc_1gb_graphics_card/index3.html> on Dec. 30, 2011,Apr. 24, 2009, 4 pages.
Chen, et al., "Strategies for 3D Video with Wide Fields-of-View", IEEE Proceeding Optoelectronics, vol. 148, Issue 2, Available at <http://ieeexplore.ieee.org/stamp/stamp.jsp?tp=&arnumber=926823>,Apr. 2001, pp. 85-90.
Chirgwin, "Researchers propose 'overclock' scheme for mobiles—Processing at a sprint to overcome tech limitations", The Register, Feb. 21, 2012, 2 pages.
Coldewey, "Researchers Propose "Computational Sprinting" to Speed Up Chips by 1000%—But Only for a Second", TechCrunch, Feb. 28, 2012, Feb. 29, 2012, 2 pages.
Deagazio, "Selecting Display Backlighting for Portable, Handheld Devices", Hearst Electronics Products, retrieved from <http://www2.electronicproducts.com/Selecting_display_backlighting_for_portable_handheld_devices-article-farcglobal-feb2008-html.aspx> on Jan. 12, 2012,Jan. 2, 2008, 4 pages.
Eadicicco, "First Transparent Tablet Lets You Touch From Both Sides", Retrieved from <http://blog.laptopmag.com/first-transparent-tablet>, Dec. 26, 2013, 4 pages.
Greenemeier, "Could "Computational Sprinting" Speed Up Smart Phones without Burning Them Out?", Scientific American, Feb. 29, 2012, 2 pages.
Han, et al., "Accurate diffraction efficiency control for multiplexed volume holographic gratings", Retrieved at: opticalengineering.spiedigitallibrary.org/data/Journals/.../2799_1, 2002, 4 pages.
Hua, et al., "Engineering of Head-mounted Projective Displays", In Proceedings of Applied Optics, vol. 39, No. 22, Aug. 1, 2000, 11 pages.
Jacques, et al., "Polarized Light Imaging of Tissue", Available at <http://www.lumamed.com/documents/5_polarized%20light%20%20imaging.pdf>,2004, 17 pages.
Jarvenpaa, et al., "Compact near-to-eye display with integrated gaze tracker", Second International Conference on Computer Engineering and Applications, Mar. 19, 2010, 9 pages.
Jaworski, et al., "A Novel Design of Heat Sink with PCM for Electronics Cooling", 10th International Conference on Thermal Energy Storage, Stockton, May 31-Jun. 2, 2006, retrieved from <https://intraweb.stockton.edu/eyos/energy_studies/content/docs/FINAL_PRESENTATIONS/4b-6%20.pdf> on Jan. 5, 2012,May 31, 2006, 8 pages.
Kress, et al., "Exit Pupil for Wearable See-through displays", Downloaded From: http://proceedings.spiedigitallibrary.org/ on Jan. 31, 2015 Terms of Use: http://spiedl.org/terms, 2012, 8 pages.
Krishnan, et al., "A Novel Hybrid Heat Sink Using Phase Change Materials for Transient Thermal Management of Electronics", IEEE transactions on components and packaging technologies, vol. 28, No. 2, retrieved from <http://ieeexplore.ieee.org/stamp/stamp.jsp?tp=&arnumber=1432936> on Jan. 5, 2012,Jun. 2005, pp. 281-289.
Lanman, et al., "Near-eye Light Field Displays", In Journal of ACM Transactions on Graphics, vol. 32, No. 6, Nov. 2013, 10 pages.
Large, et al., "Parallel Optics in Waveguide Displays: a Flat Panel Autostereoscopic", Display Technology, Journal of, Retrieved from <http://download.microsoft.com/download/D/2/E/D2E425F8-CF3C-4C71-A4A2-70F9D4081007/ParallelOpticsin-WaveguideDisplaysMS090925.Final.pdf>,Jun. 21, 2010, pp. 1-7.
Lerner, "Penn Helps Rethink Smartphone Design With 'Computational Sprinting'", Penn News Release, Feb. 28, 2012, 2 pages.
Li et al., "Design Optimization of Reflective Polarizers for LCD Backlight Recycling", Journal of Display Technology, vol. 5, No. 8, Available at <http://ieeexplore.ieee.org/stamp/stamp.jsp?tp=&arnumber=5196840 >,Aug. 2009, pp. 335-340.
Li et al., "Switchable Electro-optic Diffractive Lens with High Efficiency for Ophthalmic Applications", PNAS Apr. 18, 2006 vol. 103 No. 16 6100-6104, Retrieved from: <http://www.pnas.org/content/103/16/6100.long> Feb. 22, 2012,Feb. 2, 2006, 4 pages.
Man, et al., "IT Equipment Noise Emission Standards: Overview of New Development in the Next Edition of ISO/ECMA Standards", In Proceedings of 37th International Congress and Exposition on Noise Control Engineering, Available at <http://www.ecma-international.org/activities/Acoustics/Inter-noise%202008%20paper%20on%20ECMA-74%20updates.pdf >,Oct. 26, 2008, 8 pages.
Massenot, et al., "Multiplexed holographic transmission gratings recorded in holographic polymer-dispersed liquid crystals: static and dynamic studies", Retrieved at: http://oatao.univ-toulouse.fr/2874/, 2005, 8 pages.
McMillan, "Your Future iPhone May Be Stuffed With Wax", Aug. 23, 2013, 3 pages.
Melcher, "LCoS for High Performance Displays", In Proceedings of LEOS 2003, Available at <http://ieeexplore.ieee.org/stamp/stamp.jsp?tp=&arnumber=1253048>,Oct. 27, 2003, pp. 812-813.
Minier et al., "Diffraction Characteristics of Superimposed Holographic gratings in Planar Optical waveguides", IEEE Photonics Technology Letters, vol. 4, No. 10, Oct. 1992, 4 pages.
Moore, "Computational sprinting pushes smartphones till they're tired", Michigan News Release, Feb. 28, 2012, 2 pages.
Nguyen, et al., "Advanced Cooling System Using Miniature Heat Pipes in Mobile PC", IEEE Transactions on Components and Packaging Technology, vol. 23, No. 1, Available at <http://ieeexplore.ieee.org/stamp/stamp.jsp?tp=&arnumber=833046&userType=inst>, Mar. 2000, pp. 86-90.
Owano, "Study explores computing bursts for smartphones", PhysOrg.com, Feb. 21, 2012, 2 pages.
Papaefthymiou, et al., "Computational Sprinting on a Hardware/Software Testbed", In the Proceedings of the 18th Eighteenth International Conference on Architectural Support for Programming Languages and Operating Systems (ASPLOS), Mar. 2013., 12 pages.
Patrizio, "Researchers Working on Ways to Put 16-Core Processors in Smartphones", Brighthand, Mar. 18th, 2012, 2 pages.
Pu, et al., "Exposure schedule for multiplexing holograms in photopolymer films", Retrieved at: lo.epfl/webdav/site/lo/shared/1996/OE_35_2824_Oct1996.pdf, Oct. 1996, 6 pages.
Raghavan, et al., "Computational Sprinting", In the Proceedings of the 18th Symposium on High Performance Computer Architecture (HPCA), Feb. 2012, 12 pages.
Raghavan, et al., "Designing for Responsiveness With Computational Sprinting", IEEE Micro's "Top Picks of 2012" Issue, May 2013, 8 pages.
Scott, et al., "RearType: Text Entry Using Keys on the Back of a Device", In Proceedings of 12th Conference on Human-Computer Interaction with Mobile Devices and Services, Retrieved from <https://research.microsoft.com/pubs/135609/reartype%20mobilehci.pdf>,Sep. 7, 2010, 9 pages.
Stupar, et al., "Optimization of Phase Change Material Heat Sinks for Low Duty Cycle High Peak Load Power Supplies", IEEE transactions on components, packaging and manufacturing technology, retrieved from <http://ieeexplore.ieee.org/stamp/stamp.jsp?tp=&arnumber=6081913> on Jan. 5, 2012,Nov. 15, 2011, 14 pages.
Tari, et al., "CFD Analyses of a Notebook Computer Thermal Management System and a Proposed Passive Cooling Alternative", IEEE Transactions on Components and Packaging Technologies, vol. 33, No. 2, retrieved from <http://ieeexplore.ieee.org/stamp/stamp.jsp?tp=&arnumber=5466211> on Dec. 30, 2011,Jun. 2010, pp. 443-452.

(56) References Cited

OTHER PUBLICATIONS

Travis, et al., "Collimated Light from a Waveguide for a Display Backlight", Optics Express, Retrieved from <http://download.microsoft.com/download/D/2/E/D2E425F8-CF3C-4C71-A4A2-70F9D4081007/OpticsExpressbacklightpaper.pdf>,Oct. 15, 2009, pp. 19714-19719.

Travis, et al., "The Design of Backlights for View-Sequential 3D", Microsoft Corporation, Available at <http://download.microsoft.com/download/D/2/E/D2E425F8-CF3C-4C71-A4A2-70F9D4081007/Backlightforviewsequentialautostereo.docx>,Jul. 3, 2010, 4 pages.

Van "A Survey of Augmented Reality Technologies, Applications and Limitations", The International Journal of Virtual Reality, 2010, 9(2), Available at <http://www.ijvr.org/issues/issue2-2010/paper1%20.pdf>,Jun. 2010, pp. 1-19.

Walker "Thermalright Ultra-120 Extreme CPU Cooler", retrieved from <http://www.pro-clockers.com/cooling/66-thermalright-ultra-120-extreme-cpu-cooler.html> on Dec. 30, 2011,Jul. 2, 2009, 7 pages.

Westerinen, et al., "Light Guide Display and Field of View", U.S. Appl. No. 13/428,879, filed Mar. 23, 2012, 46 pages.

Wigdor, et al., "LucidTouch: A See-Through Mobile Device", In Proceedings of 20th Annual ACM symposium on User Interface Software and Technology, Retrieved from <http://dl.acm.org/citation.cfm?id=1294259>,Oct. 7, 2007, 10 pages.

Yan et al., "Multiplexing holograms in the photopolymer with equal diffraction efficiency", 2005, 9 pages.

Zharkova, et al., "Study of the Dynamics of Transmission Gratings Growth on Holographic Polymer-Dispersed Liquid Crystals", International Conference on Methods of Aerophysical Research, ICMAR 2008, 2008, 4 pages.

"Final Office Action", U.S. Appl. No. 13/397,539, filed Jun. 29, 2015, 11 pages.

"Foreign Office Action", EP Application No. 13769961.7, Mar. 11, 2015, 8 pages.

"Non-Final Office Action", U.S. Appl. No. 13/397,495, filed Apr. 3, 2015, 11 pages.

"Non-Final Office Action", U.S. Appl. No. 13/397,617, filed May 5, 2015, 6 pages.

"Non-Final Office Action", U.S. Appl. No. 13/428,879, filed Jun. 26, 2015, 13 pages.

"Non-Final Office Action", U.S. Appl. No. 13/432,311, filed Jun. 2, 2015, 25 pages.

"Non-Final Office Action", U.S. Appl. No. 13/477,646, filed Jun. 18, 2015, 43 pages.

"Non-Final Office Action", U.S. Appl. No. 13/722,917, filed May 21, 2015, 12 pages.

"Supplementary European Search Report", EP Application No. 13769961.7, Mar. 3, 2015, 3 pages.

"Final Office Action", U.S. Appl. No. 13/440,165, Jul. 21, 2015, 11 pages.

"Final Office Action", U.S. Appl. No. 13/774,875, Jun. 4, 2015, 10 pages.

"Final Office Action", U.S. Appl. No. 14/134,993, Jul. 16, 2015, 19 pages.

"Final Office Action", U.S. Appl. No. 14/178,731, Aug. 12, 2015, 13 pages.

"Foreign Office Action", CN Application No. 201210563730.3, Aug. 14, 2015, 4 Pages.

"Foreign Office Action", EP Application No. 13765041.2, Aug. 5, 2015, 6 pages.

"Foreign Office Action", EP Application No. 13769961.7, Jun. 30, 2015, 6 pages.

"Foreign Office Action", EP Application No. 13770174.4, Jul. 1, 2015, 6 pages.

"Restriction Requirement", U.S. Appl. No. 13/420,388, Aug. 13, 2015, 6 pages.

"Supplementary European Search Report", EP Application No. 13765041.2, Jul. 21, 2015, 3 pages.

"Final Office Action", U.S. Appl. No. 13/722,917, Sep. 23, 2015, 14 pages.

"Non-Final Office Action", U.S. Appl. No. 13/397,516, Sep. 24, 2015, 14 pages.

"Non-Final Office Action", U.S. Appl. No. 13/397,539, Oct. 1, 2015, 12 pages.

"Non-Final Office Action", U.S. Appl. No. 13/774,875, Sep. 16, 2015, 8 pages.

"Notice of Allowance", U.S. Appl. No. 13/397,495, Oct. 20, 2015, 6 pages.

\* cited by examiner

PIXEL OPACITY FOR AUGMENTED REALITY

BACKGROUND

Virtual reality can be viewed as a computer-generated simulated environment in which a user has an apparent physical presence. A virtual reality experience can be generated in 3D and viewed with a head-mounted display (HMD), such as glasses or other wearable display device that has near-eye display panels as lenses to display a virtual reality environment, which replaces the actual environment. Augmented reality, however, provides that a user can still see through the display lenses of the glasses or other wearable display device to view the surrounding environment, yet also see images of virtual objects that are generated for display and appear as a part of the environment. Augmented reality can include any type of input such as audio and haptic inputs, as well as virtual images, graphics, and video that enhances or augments the environment that a user experiences. As an emerging technology, there are many challenges and design constraints with augmented reality, from generation of the virtual objects and images so that they appear realistic in a real environment, to developing the optics small and precise enough for implementation with a wearable display device.

SUMMARY

This Summary introduces simplified concepts of pixel opacity for augmented reality, and the concepts are further described below in the Detailed Description and/or shown in the Figures. This Summary should not be considered to describe essential features of the claimed subject matter, nor used to determine or limit the scope of the claimed subject matter.

Pixel opacity for augmented reality is described. In embodiments, a display lens system includes a first display panel that displays a virtual image generated to appear as part of an environment viewed through optical lenses. A second display panel displays an environment image of the environment as viewed through the optical lenses, and the environment image includes opaque pixels that form a black silhouette of the virtual image. The display lens system also includes a beam-splitter panel to transmit light of the environment image and reflect light of the virtual image to form a composite image that appears as the virtual image displayed over the opaque pixels of the environment image.

In other embodiments, an imaging application generates the virtual image from virtual image data for display on the first display panel. The imaging application is implemented to correlate a location of the opaque pixels on the second display panel with a display position of the virtual image on the first display panel, and control pixel illumination of the second display panel to turn-off the opaque pixels, or otherwise spatially modulate the second display panel.

BRIEF DESCRIPTION OF THE DRAWINGS

Embodiments of pixel opacity for augmented reality are described with reference to the following Figures. The same numbers may be used throughout to reference like features and components that are shown in the Figures.

DETAILED DESCRIPTION

Embodiments of pixel opacity for augmented reality are described. As noted above, a challenge to the implementation of augmented reality is generating virtual images so that they appear realistic in a real environment when viewed by a user through a wearable display device, such as a head-mounted display (HMD). A virtual image, such as any type of object, video, text, graphic, and the like, may appear semi-translucent to a user when the virtual image is displayed over a real environment. Pixel opacity for augmented reality provides a technique to enhance the contrast of a virtual image relative to an environment image when the virtual image is displayed to appear as part of the environment, and without the virtual image appearing translucent.

In embodiments, an imaging application is implemented to generate a virtual image for display to appear as part of a surrounding environment when viewed by a user through left and right display lens systems of a wearable display device. The imaging application is also implemented to correlate the display position of the virtual image over an environment image, and then black-out pixels that correlate to the display position of the virtual image on a display panel that displays the environment image. The blacked-out pixels are opaque and form a filled-in outline, or black silhouette, of the virtual image in the environment image. Therefore, the virtual image does not appear translucent because there is no illumination behind the virtual image from the opaque pixels.

While features and concepts of pixel opacity for augmented reality can be implemented in any number of different devices, systems, environments, and/or configurations, embodiments of pixel opacity for augmented reality are described in the context of the following example devices, systems, and methods.

Figure 1:
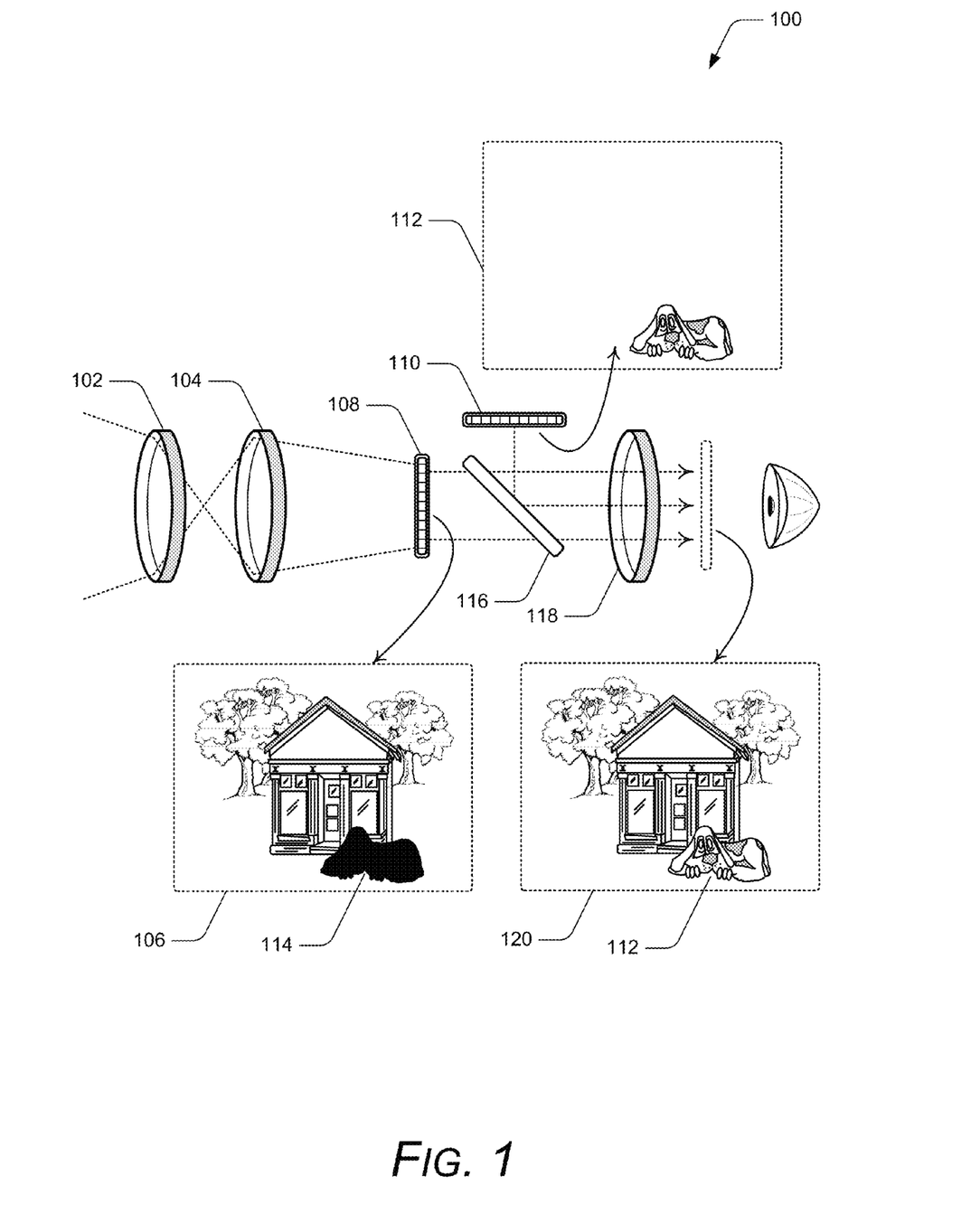
FIG. 1 illustrates an example imaging system in which embodiments of pixel opacity for augmented reality can be implemented.

FIG. 1 illustrates an example imaging system 100 in which various embodiments of pixel opacity for augmented reality can be implemented. The example imaging system is representative of a refracting telescope having a one-to-one magnification through which a user can view the surrounding environment. The example imaging system includes various optical lenses of the refracting telescope. An objective lens 102 and an erector lens 104 project an environment image 106 on a display panel 108, such as a transparent LCD (liquid crystal display), or any other type of transmissive or reflective display panel. The imaging system also includes a display panel 110 to display a virtual image 112 that is generated to appear as part of the environment when viewed through the optical lenses of the imaging system. A virtual image may be any type of object, video, text, graphic, and the like that is generated for display as part of the environment in implementations of augmented reality.

Figure 5:
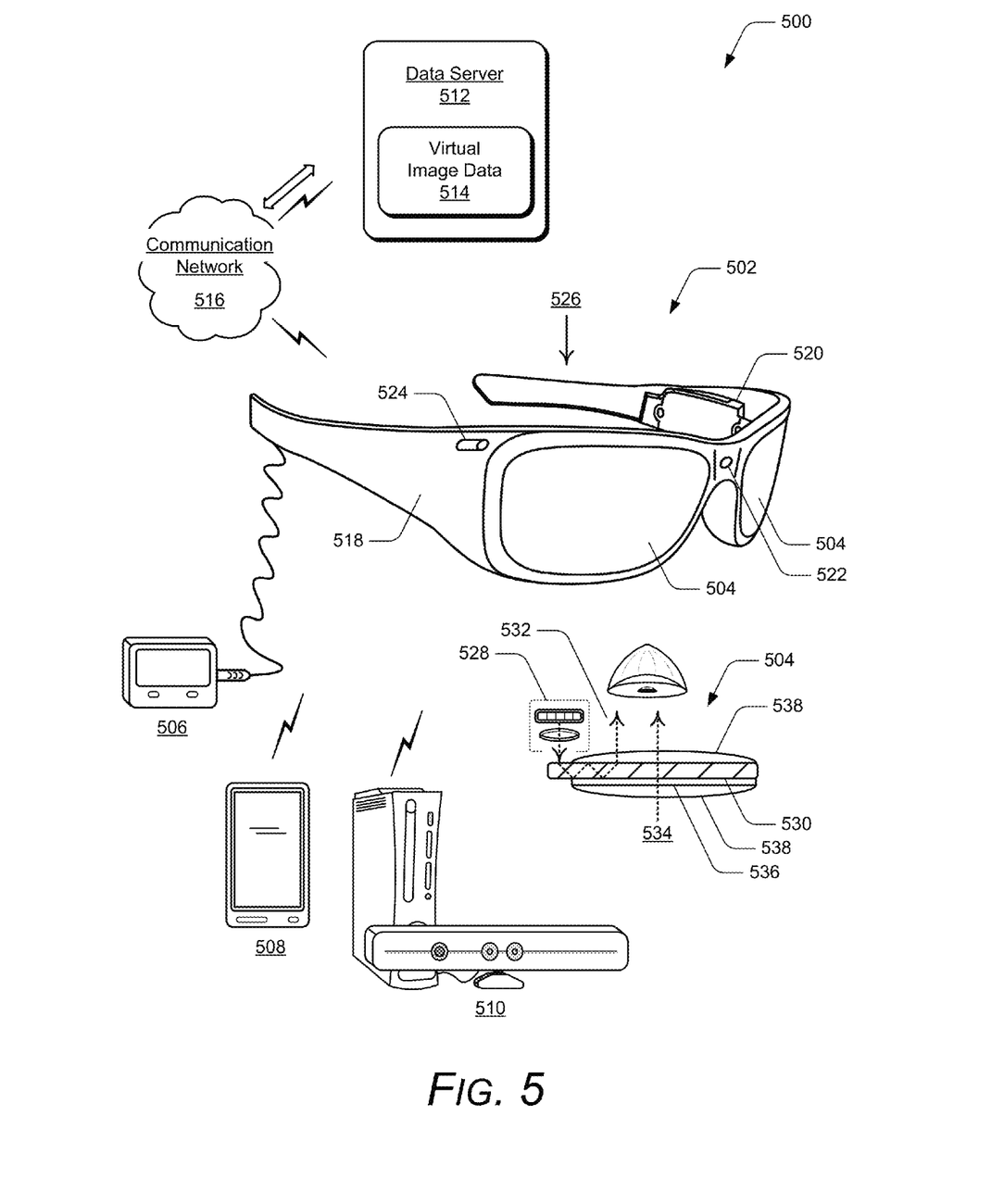
FIG. 5 illustrates an example system that includes an example of a wearable display device in which embodiments of pixel opacity for augmented reality can be implemented.

In embodiments, the example imaging system 100 can be implemented as left and right display lens systems of a wearable display device, such as described with reference to FIG.

5. A wearable display device can be implemented as any type of glasses or head-mounted display (HMD) that includes implementations of the imaging system 100 (e.g., as left and right display lens systems) through which a user can view the surrounding environment, yet also see virtual images that are generated for display and appear as a part of the environment. The wearable display device and/or a controller unit for the wearable display device implements an imaging application, such as a software application, to implement embodiments of pixel opacity for augmented reality as described herein.

In embodiments, the imaging application generates the virtual image 112 for display on the display panel 110. The imaging application is also implemented to spatially modulate, or otherwise individually control the pixels of the display panel 108 for pixel-level opacity of the pixels that correlate to a display position of the virtual image 112 in the environment image 106. For example, the display panel 108 may be configured for pixel on-off control to block the light, and the imaging application controls the pixel illumination of the opaque pixels 114 that correlate to the display position of the virtual image. The opaque pixels form a filled-in outline, or black silhouette, of the virtual image in the environment image. In an alternate implementation, the imaging application can control blacking-out all of the display panel 108 and generating a completely new visual as the virtual image for display on the display panel 110.

The example imaging system 100 includes a beam-splitter panel 116 (also commonly referred to as a 50/50 mirror, or polarizing beam-splitter). The beam-splitter panel is implemented to transmit light of the environment image 106, and reflect light of the virtual image 112, through an eyepiece optic 118 to form a composite image 120 that appears as the virtual image displayed over the opaque pixels 114 of the environment image. The blacked-out, opaque pixels provide that the virtual image does not appear translucent, but rather appears with a high contrast relative to the environment image in the composite image.

Figure 2:
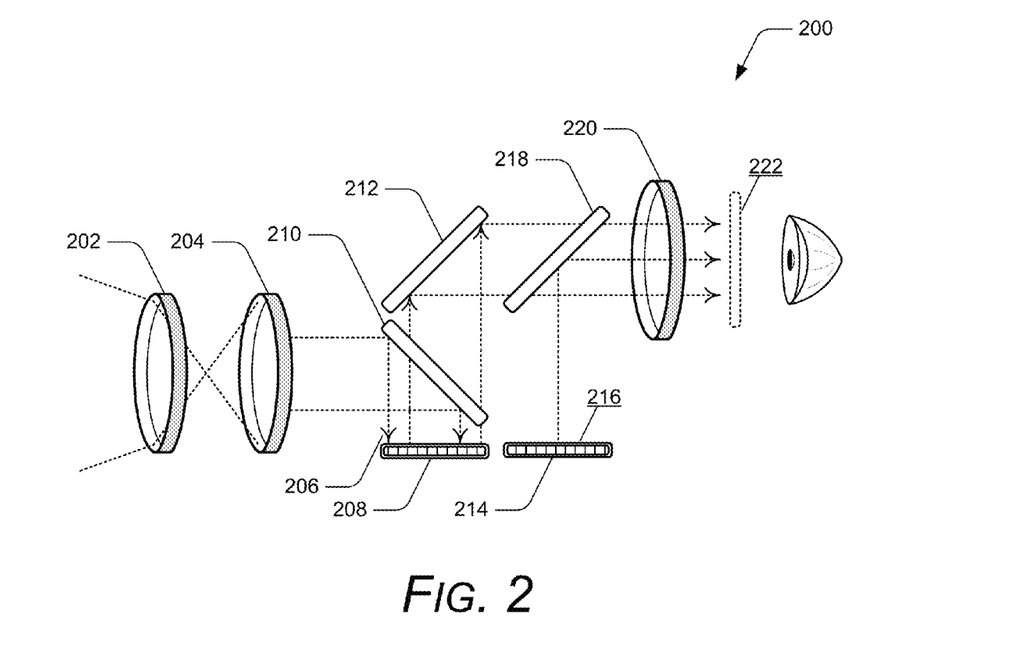
FIGS. 2-4 illustrate additional examples of imaging systems in which embodiments of pixel opacity for augmented reality can be implemented.

FIG. 2 illustrates another example imaging system 200 in which various embodiments of pixel opacity for augmented reality can be implemented. Similar to the example imaging system described with reference to FIG. 1, the example imaging system 200 is representative of a refracting telescope having a one-to-one magnification through which a user can view the surrounding environment. The example imaging system can also be implemented as left and right display lens systems of a wearable display device, such as described with reference to FIG. 5.

The example imaging system 200 includes an objective lens 202 and an erector lens 204 that project an environment image 206 on a display panel 208, such as a reflective LCOS (liquid crystal on silicon) display, or any other type of reflective display panel (e.g., DLP or DMD). The environment image is reflected from a beam-splitter panel 210 (or polarizing beam-splitter panel) onto the display panel 208. The environment image is then reflected back from the display panel, through the beam-splitter panel 210, to a mirror panel 212. The imaging system also includes a display panel 214 to display a virtual image 216 that is generated to appear as part of the environment when viewed through the optical lenses of the imaging system. A second beam-splitter panel 218 is implemented to transmit light of the environment image 206, and reflect light of the virtual image 216, through an eyepiece optic 220 to form a composite image 222 that appears as the virtual image displayed over opaque pixels of the environment image.

Examples of an environment image, a virtual image, a composite image, and opaque pixels of the environment image are described with reference to the example imaging system shown in FIG. 1. Further, the imaging application is implemented to spatially modulate, or otherwise individually control the pixels of the display panel 208 for pixel-level opacity of the pixels that correlate to a display position of the virtual image in the environment image.

Figure 3:
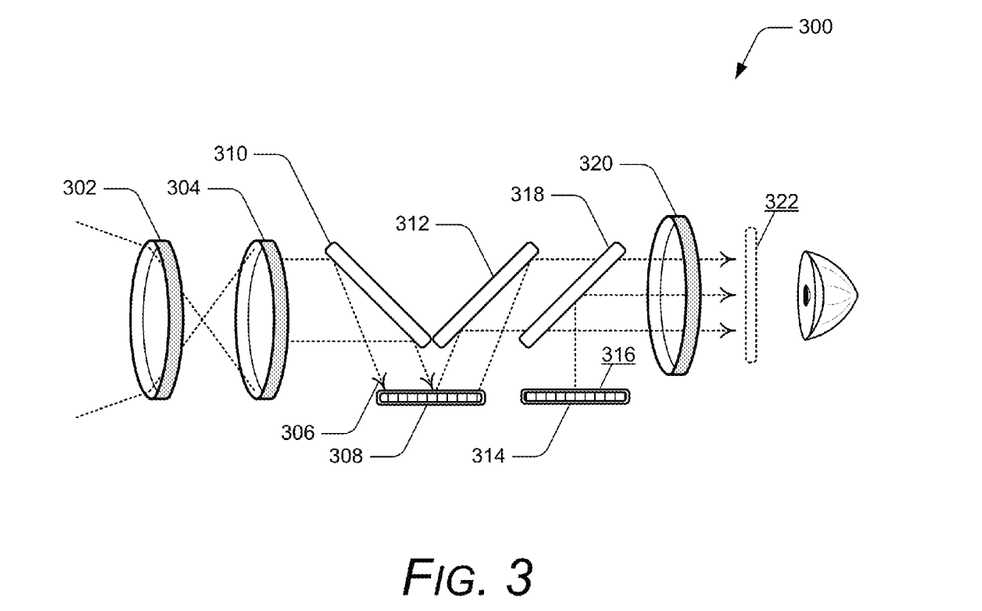

FIG. 3 illustrates another example imaging system 300 in which various embodiments of pixel opacity for augmented reality can be implemented. This example imaging system includes similar components described with reference to the imaging system shown in FIG. 2, in a different configuration. The example imaging system 300 can also be implemented as left and right display lens systems of a wearable display device, such as described with reference to FIG. 5.

The example imaging system 300 includes an objective lens 302 and an erector lens 304 that project an environment image 306 on a display panel 308, such as a reflective LCOS (liquid crystal on silicon) display, or any other type of reflective display panel (e.g., DLP or DMD). The environment image is reflected from a mirror panel 310 onto the display panel 308. The environment image is then reflected back from the display panel to a mirror panel 312. The imaging system also includes a display panel 314 to display a virtual image 316 that is generated to appear as part of the environment when viewed through the optical lenses of the imaging system. A beam-splitter panel 318 is implemented to transmit light of the environment image 306, and reflect light of the virtual image 316, through an eyepiece optic 320 to form a composite image 322 that appears as the virtual image displayed over opaque pixels of the environment image.

Examples of an environment image, a virtual image, a composite image, and opaque pixels of the environment image are described with reference to the example imaging system shown in FIG. 1. Further, the imaging application can be implemented to spatially modulate, or otherwise individually control the pixels of the display panel 308 for pixel-level opacity of the pixels that correlate to a display position of the virtual image in the environment image.

Figure 4:
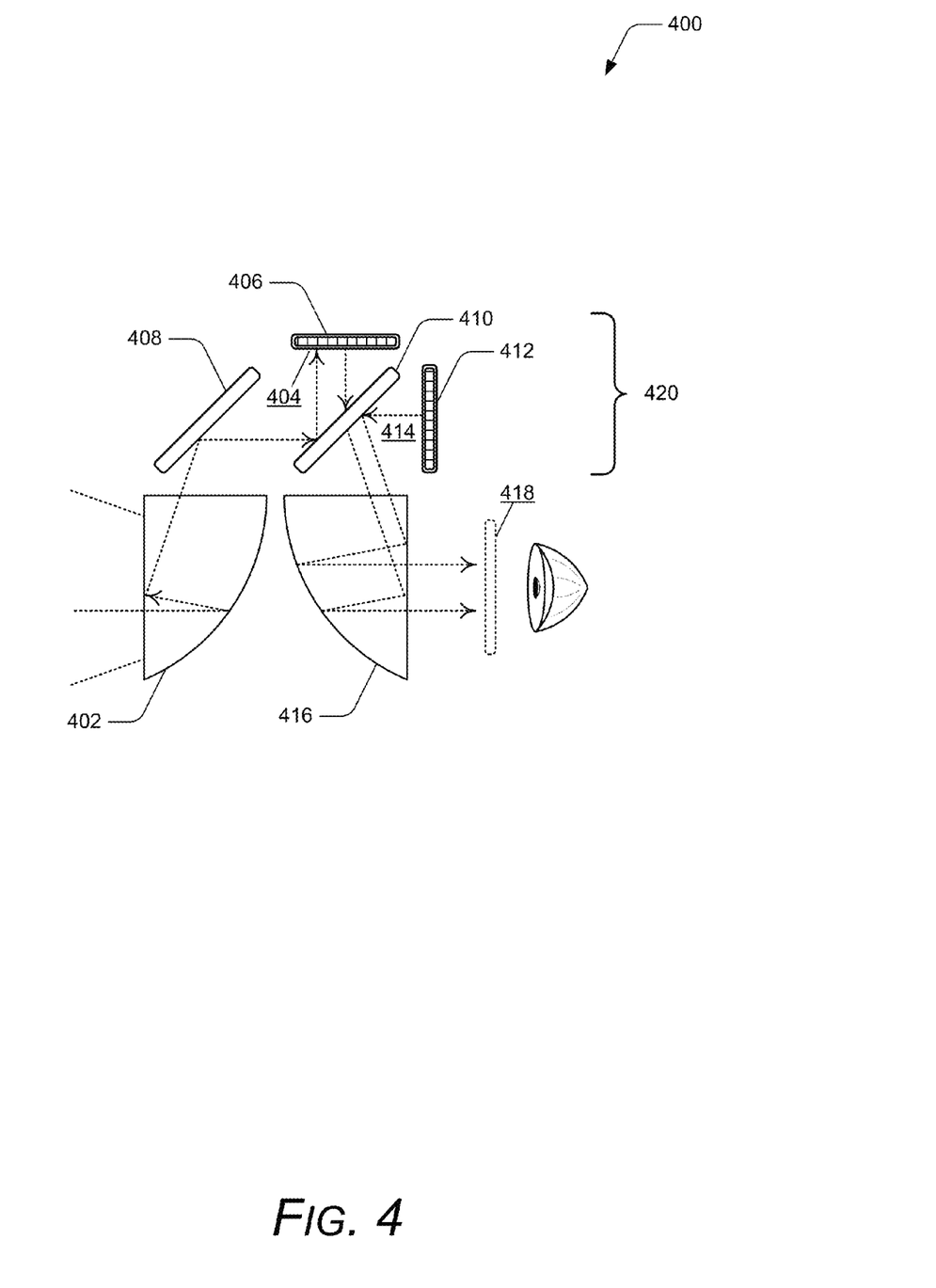

FIG. 4 illustrates another example imaging system 400 in which various embodiments of pixel opacity for augmented reality can be implemented. This example imaging system is implemented with reflective and refractive optical power components, such as with freeform prisms in an inverted configuration. Alternatively, the example imaging system may be implemented with reflective optical power components. The example imaging system 400 can also be implemented as left and right display lens systems of a wearable display device, such as described with reference to FIG. 5.

The example imaging system 400 includes a first reflective and refractive optical power element 402 that projects an environment image 404 up to a display panel 406, such as a reflective LCOS (liquid crystal on silicon) display, or any other type of reflective display panel (e.g., DLP or DMD). The environment image is reflected from the first reflective element 402, onto a mirror panel 408, and from a beam-splitter panel 410 to the display panel 406. The environment image is then reflected back from the display panel to the beam-splitter panel 410. The imaging system also includes a display panel 412 to display a virtual image 414 that is generated to appear as part of the environment when viewed through the reflective elements. The beam-splitter panel 410 is implemented to transmit light of the environment image 404, and reflect light of the virtual image 414, to a second reflective and refractive optical power element 416 to form a composite image 418 that appears as the virtual image displayed over opaque pixels of the environment image. In this example, the first and second reflective elements are implemented for total internal reflection (TIR) to reflect the light of the environment image and/or the virtual image.

Examples of an environment image, a virtual image, a composite image, and opaque pixels of the environment image are described with reference to the example imaging system shown in FIG. 1. Further, the imaging application can be implemented to spatially modulate, or otherwise individually control the pixels of the display panel 406 for pixel-level opacity of the pixels that correlate to a display position of the virtual image in the environment image.

In the example imaging system 400, the display panels 406 and 412, along with the mirror panel 408 and the beam-splitter panel 410, form an imaging unit 420 of the imaging system. In embodiments, the imaging unit 420 can be mounted on and/or integrated into the frame of a wearable display device, such as the wearable display device described with reference to FIG. 5. The imaging unit 420 can be integrated into the frame or mounted on top of the frame above a display lens of the wearable display device (also referred to as brow-mounted). Alternatively, the imaging unit 420 can be integrated into or mounted on the side of the frame of the wearable display device (also referred to as temple-mounted).

FIG. 5 illustrates an example system 500 that includes an example wearable display device 502 in which embodiments of pixel opacity for augmented reality can be implemented. The wearable display device can be implemented as any type of glasses or head-mounted display (HMD) that includes display lens systems 504 (e.g., left and right display lens systems) through which a user can view the surrounding environment, yet also see virtual images (e.g., any type of object, video, text, graphic, and the like) that are generated for display and appear as a part of the environment.

The wearable display device 502 can be implemented as an independent, portable system that includes memory, software, a processor, and/or a power source. Alternatively or in addition, the wearable display device may be communicatively linked to a controller 506 that includes any one or combination of the memory, software, processor, and/or power source, such as a battery unit. The controller can be implemented for wired or wireless communication with the wearable display device. The controller and/or the wearable display device can also be implemented with any number and combination of differing components as further described with reference to the example device shown in FIG. 7. For example, the controller and/or the wearable display device includes an imaging application implemented as computer-executable instructions, such as a software application, and executed by a processor to implement embodiments of pixel opacity for augmented reality as described herein.

In embodiments, the controller may be implemented as a dedicated device (e.g., the wired controller 506), as a mobile phone 508, a tablet or other portable computer device, a gaming system 510, or as any other type of electronic device that can be implemented to process and generate virtual images for display as part of the environment that is viewed through the display lens system of the wearable display device. The controller may communicate with the wearable display device wirelessly via WiFi™, Bluetooth™, infrared (IR), RFID transmission, wireless Universal Serial Bus (WUSB), cellular, or via other wireless communication techniques.

The example system 500 also includes a data server 512, or data service, that communicates, or otherwise distributes, virtual image data 514 to the wearable display device 502 via a communication network 516. For example, the data server may be part of a network-based gaming system that generates virtual images for augmented reality display at the wearable display device. Alternatively, the data server may be part of a navigation system that communicates navigation directions and information for display in the display lens systems 504 of the wearable display device. In another example, the data server may be part of a messaging service, such as an e-mail or text messaging system, that communicates e-mail and/or text messages to the wearable display device for display in the display lens systems, where a user can read a message as an augmented reality image that is displayed over the environment viewed through the wearable display device.

Any of the devices, servers, and/or services can communicate via the communication network 516, which may be implemented to include wired and/or wireless networks. The communication network can also be implemented using any type of network topology and/or communication protocol, and can be represented or otherwise implemented as a combination of two or more networks, to include IP-based networks and/or the Internet. The communication network may also include mobile operator networks that are managed by mobile operators, such as a communication service provider, cell-phone provider, and/or Internet service provider.

The wearable display device 502 includes a frame 518, such as in the form of glasses, goggles, or any other structure, that supports and incorporates the various components of the device, as well as serves as a conduit for electrical and other component connections. A components module 520 (or components modules on the left, right, and/or both sides of the device frame) incorporates any of the various components, such as processing and control circuitry, memory, software, a processor, GPS transceiver, and/or power source. The wearable display device may also include a microphone 522 to record audio data from the surrounding environment, as well as ear phones for audio feedback as part of an augmented reality experience.

The wearable display device 502 also includes various cameras 524 that capture video and still images of the surrounding environment. The image and video data can be processed on the device and/or by a controller device (e.g., controller 506), and used to create a mapping field to orient and track a user in the environment space. The wearable display device can also include eye tracking cameras used to determine a user's eyeball location and track eye movements. The wearable display device may also include a temperature sensor, as well as inertial sensors for sensing position, orientation, and acceleration of the wearable display device.

An example of one display lens system 504 is shown from a viewer perspective 526 of the wearable display device 502, as if viewing the display lens system from the top of the device. The display lens system includes an imaging system 528, which can be implemented with any number of micro display panels, lenses, and reflecting elements to display and project a virtual image into a see-through and reflecting waveguide 530. A display lens system 504 and/or the imaging system 528 can be implemented as any of the imaging systems described with reference to the previous FIGS. 1-4 to implement embodiments of pixel opacity for augmented reality. The see-through, reflecting waveguide 530 is implemented for internal reflection and conducts the visible light 532 of a virtual image that is generated by the imaging unit for viewing by a user, and also passes through the light 534 from the surrounding environment for viewing by the user.

The micro display panels, lenses, and/or reflecting elements of the imaging system 528 can be implemented with various display technologies, such as implemented with a transparent LCD, or using a transmissive projection technology where the light source is modulated by optically active material, backlit with white light. These technologies can be implemented using LCD type displays with powerful backlights and high optical energy densities. Alternatively, a micro display and/or reflecting element can be implemented using a reflective technology, such as digital light processing (DLP) and liquid crystal on silicon (LCOS), that reflects external light, which is reflected and modulated by an optical material.

In embodiments, the imaging system 528 (or other components of a display lens system 504) can be implemented to include an infra-red (IR) laser utilized for system calibrations and/or as an illumination source for an eye-tracking system and camera that tracks the position of a user's eyes. The eye-tracking system includes the eye-tracking illumination source, which is not a visible light, and includes an eye-tracking IR sensor. The IR sensor can be implemented as an IR camera that provides infrared image data of the eye for eye-tracking processing, or an IR sensor that detects eye reflections when the eye is illuminated. The see-through and reflecting waveguide 530 can also be utilized for the infrared illumination, and for eyeball reflections that the eye-tracking system uses to track the position of the user's eyes.

In this example, the display lens systems 504 include an optional opacity filter 536, and a see-through lens 538 on each side of the waveguide 530. The see-through lenses can be standard eye-glass lenses and made to prescription (or no prescription). The opacity filter selectively blocks natural light, either uniformly or on a per-pixel basis, from passing through the see-through and reflecting waveguide to enhance the contrast of a displayed virtual image.

Example method 600 is described with reference to FIG. 6 in accordance with one or more embodiments of pixel opacity for augmented reality. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 6:
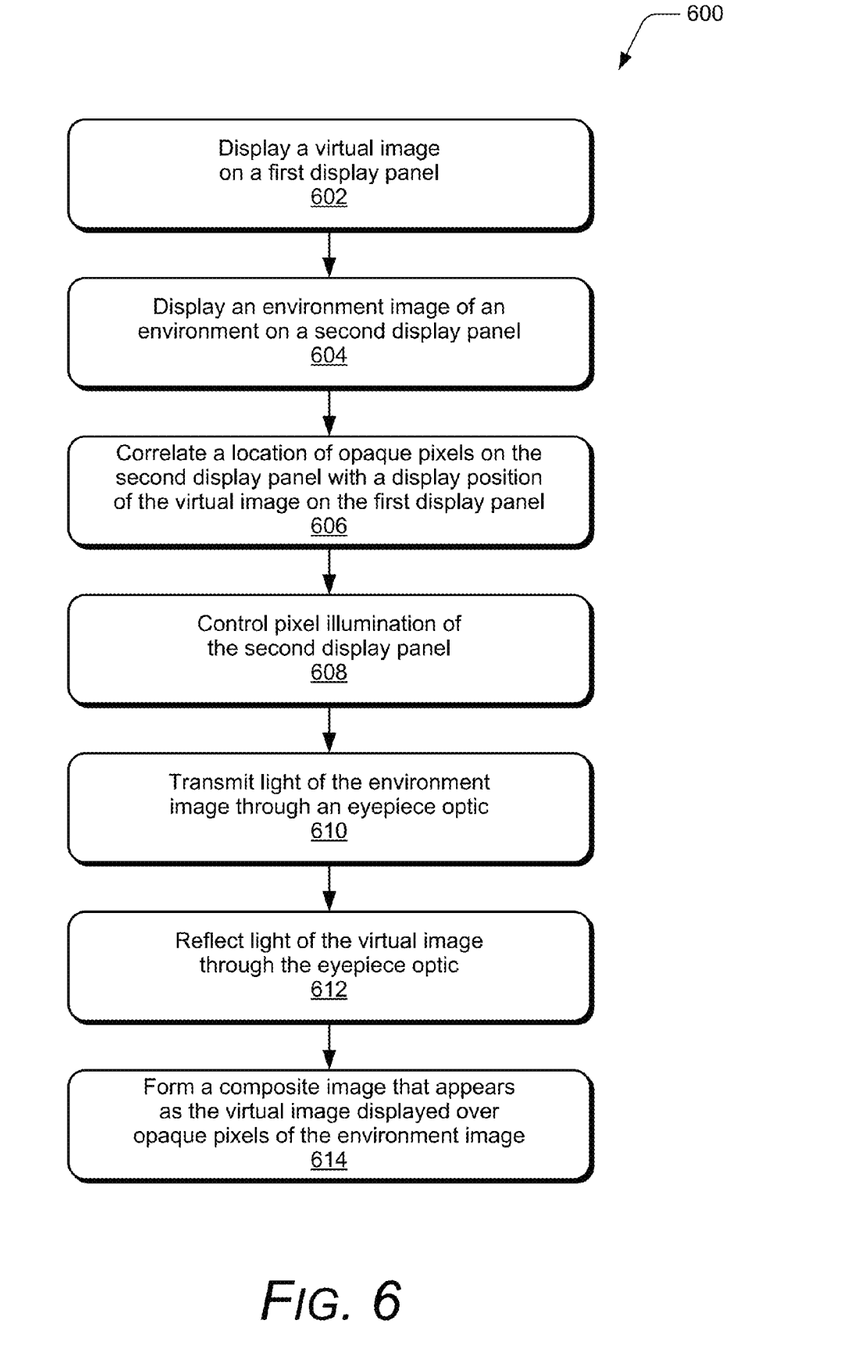
FIG. 6 illustrates example method(s) of pixel opacity for augmented reality in accordance with one or more embodiments.

FIG. 6 illustrates example method(s) 600 of pixel opacity for augmented reality. The order in which the method blocks are described are not intended to be construed as a limitation, and any number of the described method blocks can be combined in any order to implement a method, or an alternate method.

At block 602, a virtual image is displayed on a first display panel. For example, the display panel 110 (FIG. 1) displays the virtual image 112 that is generated to appear as part of an environment viewed through the optical lenses of the imaging system 100. At block 604, an environment image of the environment is displayed on a second display panel. For example, the display panel 108 displays the environment image 106, including opaque pixels 114 that form a black silhouette of the virtual image. In embodiments, the imaging application 720 (FIG. 7) generates the virtual image for display to appear as part of the surrounding environment when viewed by a user through left and right display lens systems of a wearable display device 502 (FIG. 5).

Figure 7:
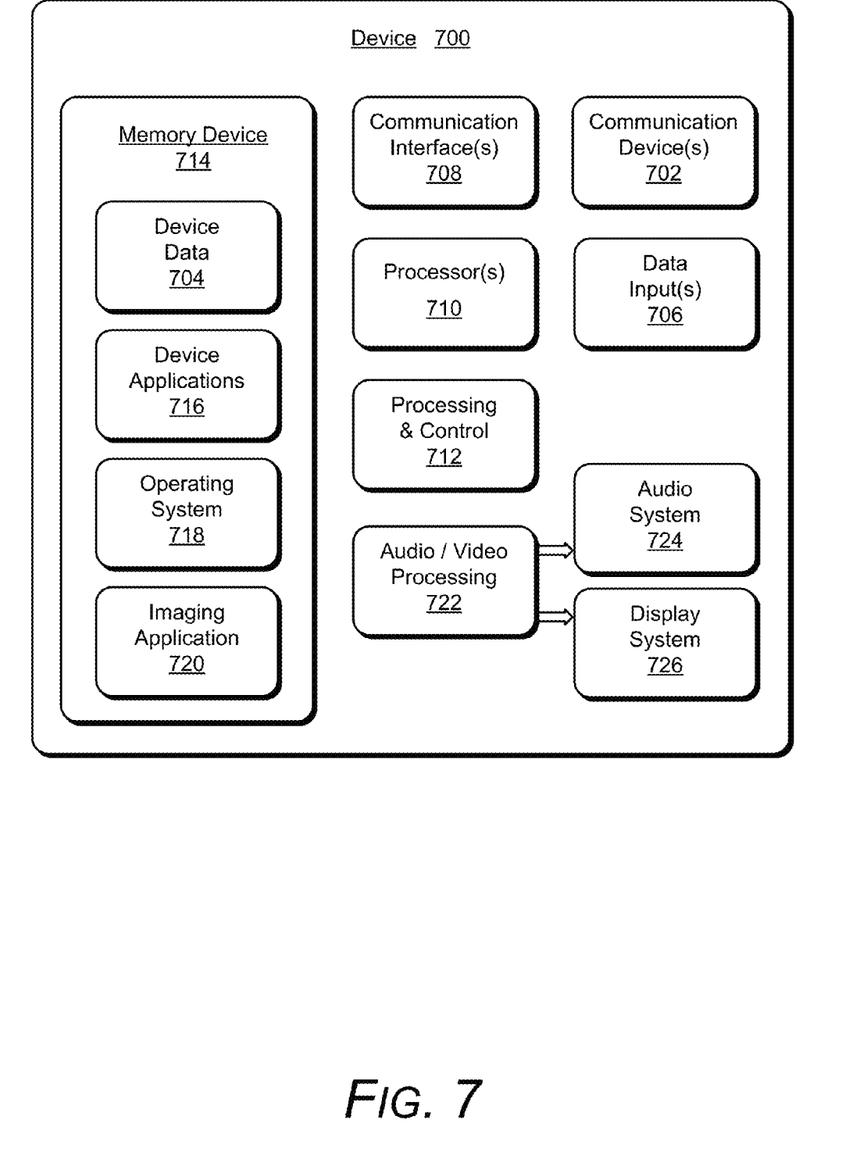
FIG. 7 illustrates various components of an example device that can implement embodiments of pixel opacity for augmented reality.

At block 606, a location of opaque pixels on the second display panel is correlated with a display position of the virtual image on the first display panel and, at block 608, pixel illumination of the second display panel is controlled. For example, the imaging application 720 spatially modulates, or otherwise individually controls the pixels of the display panel 108 for pixel-level opacity of the pixels that correlate to the display position of the virtual image 112 in the environment image 106. The display panel 108 may be configured for pixel on-off control to block the light, and the imaging application controls the pixel illumination to turn-off the opaque pixels 114 that correlate to the display position of the virtual image.

At block 610, light of the environment image is transmitted through an eyepiece optic and, at block 612, light of the virtual image is reflected through the eyepiece optic. At block 614, a composite image is formed that appears as the virtual image displayed over opaque pixels of the environment image. For example, the beam-splitter panel 116 transmits light of the environment image 106 (e.g., as illuminated from the display panel 108), and reflects light of the virtual image 112 (e.g., as illuminated from the display panel 110), through an eyepiece optic 118 to form a composite image 120 that appears as the virtual image 112 displayed over the opaque pixels 114 of the environment image. The blacked-out, opaque pixels of the environment image provide that the virtual image does not appear translucent, but rather appears with a high contrast relative to the environment image in the composite image.

FIG. 7 illustrates various components of an example device 700 that can be implemented as any of the devices described with reference to the previous FIGS. 1-6, such as a wearable display device and/or a controller for a wearable display device. In embodiments, the device may be implemented as any one or combination of a fixed or mobile device, in any form of a consumer, computer, portable, communication, phone, navigation, appliance, gaming, media playback, and/or electronic device. The device may also be associated with a user (i.e., a person) and/or an entity that operates the device such that a device describes logical devices that include users, software, firmware, hardware, and/or a combination of devices.

The device 700 includes communication devices 702 that enable wired and/or wireless communication of device data 704, such as virtual image data, as well as video and images data, and other media content stored on the device. The media content stored on the device can include any type of audio, video, and/or image data. The device includes one or more data inputs 706 via which any type of data, media content, and/or inputs can be received, such as user-selectable inputs and any other type of audio, video, and/or image data received from any content and/or data source.

The device 700 also includes communication interfaces 708, such as any one or more of a serial, parallel, network, or wireless interface. The communication interfaces provide a connection and/or communication links between the device and a communication network by which other electronic, computing, and communication devices communicate data with the device.

The device 700 includes one or more processors 710 (e.g., any of microprocessors, controllers, and the like), which process computer-executable instructions to control the operation of the device. Alternatively or in addition, the device can be implemented with any one or combination of software, hardware, firmware, or fixed logic circuitry that is implemented in connection with processing and control circuits which are generally identified at 712. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 700 also includes one or more memory devices 714 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device. Computer-readable storage media can be any available medium or media that is accessed by a computing device.

A memory device 714 provides data storage mechanisms to store the device data 704, other types of information and/or data, and device applications 716. For example, an operating system 718 can be maintained as a software application with the memory device and executed on the processors. The device applications may also include a device manager or controller, such as any form of a control application, software application, signal processing and control module, code that is native to a particular device, a hardware abstraction layer for a particular device, and so on. In this example, the device applications also include an imaging application 720 that implements embodiments of pixel opacity for augmented reality as described herein.

The device 700 may also include an audio and/or video processing system 722 that generates audio data for an audio system 724 and/or generates display data for a display system 726. In implementations, the audio system and/or the display system are external components to the device. Alternatively, the audio system and/or the display system are integrated components of the example device.

Although embodiments of pixel opacity for augmented reality have been described in language specific to features and/or methods, the appended claims are not necessarily limited to the specific features or methods described. Rather, the specific features and methods are disclosed as example implementations of pixel opacity for augmented reality.

The invention claimed is:

1. A wearable display device, comprising:
    a left display lens system configured to form a composite image for viewing;
    a right display lens system configured to form the composite image for viewing;
    the left and right display lens systems each comprising:
        a display panel configured to display an environment image of an environment, the environment image including opaque pixels that form a black silhouette of a virtual image;
        a first freeform prism inverted relative to a second freeform prism, the first freeform prism configured to project the environment image onto the display panel and the second freeform prism configured to reflect the composite image for viewing; and
    the composite image formed with the virtual image displayed over the opaque pixels of the environment image to augment reality of the environment that is viewed through the left and right display lens systems.

2. A wearable display device as recited in claim 1, wherein each of the left and right display lens systems further comprise:
    a second display panel configured to display the virtual image.

3. A wearable display device as recited in claim 2, further comprising a computer processing system to implement an imaging application that is configured to spatially modulate the display panel of the left and right display lens systems to correlate a location of the opaque pixels with a display position of the virtual image on the second display panel of the left and right display lens systems.

4. A wearable display device as recited in claim 2, further comprising a controller that includes a computer processing system to implement an imaging application configured to:
    correlate a location of the opaque pixels on the display panel of the left and right display lens systems with a display position of the virtual image on the second display panel of the left and right display lens systems; and
    control pixel illumination of the display panel of the left and right display lens systems to turn-off the opaque pixels.

5. A wearable display device as recited in claim 1, further comprising a camera configured to capture the environment image for pixelated display on the display panel.

6. An imaging system, comprising:
    a first display panel configured to display an environment image of the environment, the environment image including opaque pixels that form a black silhouette of a virtual image;
    a first freeform prism configured to project the environment image onto the first display panel;
    a second display panel configured to display the virtual image; and
    a second freeform prism inverted relative to the first freeform prism configured to reflect a composite image that appears as the virtual image displayed over the opaque pixels of the environment image.

7. An imaging system as recited in claim 6, wherein the virtual image appears with a high contrast relative to the environment image in the composite image.

8. An imaging system as recited in claim 6, further comprising a camera configured to capture the environment image for pixelated display on the first display panel.

9. An imaging system as recited in claim 6, wherein the first display panel is one of a transparent LCD or a reflective LCOS, the first display panel comprised of pixels configured for on-off control, and wherein the opaque pixels are turned off.

10. An imaging system as recited in claim 6, further comprising an imaging application configured to spatially modulate the first display panel to correlate a location of the opaque pixels with a display position of the virtual image on the second display panel.

11. An imaging system as recited in claim 6, further comprising:
    a mirror panel configured to reflect the environmental image received from the first freeform prism to a beamsplitter that is configured to reflect the environmental image to the first display panel.

12. An imaging system as recited in claim 11, wherein the beam splitter is further configured to transmit light of the environmental image and reflect light of the virtual image to the second freeform prism.

13. A imaging system as recited in claim 6, wherein the first display panel, the first freeform prism, the second display panel, and the second freeform prism are integrated into or mounted on the side of the frame of a wearable display device.

14. A imaging system as recited in claim 6, wherein the first display panel, the first freeform prism, the second display panel, and the second freeform prism are integrated into or mounted on top of a display lens of a wearable display device.

15. An imaging system as recited in claim 6, further comprising an imaging application configured to:
- generate the virtual image from virtual image data for display on the second display panel;
- correlate a location of the opaque pixels on the first display panel with a display position of the virtual image on the second display panel; and
- control pixel illumination of the first display panel to turn-off the opaque pixels.

16. A method comprising:
- projecting an environment image of an environment onto a first display panel using a first freeform prism;
- displaying the environment image on the first display panel, the environment image configured to include opaque pixels that form a black silhouette of a virtual image;
- displaying the virtual image on a second display panel; and
- forming a composite image with the virtual image displayed over the opaque pixels of the environment image, the composite image configured to be reflected for viewing via a second freeform prism that is inverted relative to the first freeform prism.

17. A method as recited in claim 16, wherein the virtual image appears with a high contrast relative to the environment image in the composite image.

18. A method as recited in claim 16, further comprising capturing the environment image with a camera for pixelated display on the first display panel.

19. A method as recited in claim 16, further comprising correlating a location of the opaque pixels on the first display panel with a display position of the virtual image on the second display panel.

20. A method as recited in claim 16, further comprising controlling pixel illumination of the first display panel to turn-off the opaque pixels.

* * * * *